United States Patent [19]
Eppolito

[11] Patent Number: 4,847,693
[45] Date of Patent: Jul. 11, 1989

[54] COMPOSITE PROCESS VIDEO AND MOTION PICTURE PHOTOGRAPHY SYSTEM AND METHOD

[75] Inventor: John Eppolito, Pasadena, Calif.

[73] Assignee: Ultramatrix, Inc., Los Angeles, Calif.

[21] Appl. No.: 42,169

[22] Filed: Apr. 24, 1987

[51] Int. Cl.$^4$ .................................... H04N 5/225
[52] U.S. Cl. .............................. 358/225; 354/291; 354/195.1; 352/47
[58] Field of Search .............. 358/225; 352/38, 44, 352/47, 48, 49, 85, 88, 89, 110, 117, 122, 291, 292, 77

[56] References Cited
U.S. PATENT DOCUMENTS

| | | | |
|---|---|---|---|
| 2,727,427 | 10/1955 | Jenkins | 352/47 |
| 3,605,596 | 9/1971 | Vockenhuber et al. | 354/195.1 |
| 4,183,644 | 1/1980 | Tureck et al. | 354/291 |
| 4,527,872 | 7/1985 | Gentleman et al. | 352/47 |

Primary Examiner—Russell E. Adams
Attorney, Agent, or Firm—Blakely, Sokoloff, Taylor, Zafman

[57] ABSTRACT

The present invention comprises a novel composite process photography system and method. A negative lens or a curved mirror is used to produce a miniature virtual image of a scene a short distance from a camera. The camera focusses on the virtual images. Props, models, and pictures are superimposed with the virtual image by positioning them at a distance equal to the distance of the virtual image from the camera and using beam splitters to allow the camera simultaneously view the props and the virtual image. In one embodiment of the invention, the virtual image is formed inside a compact enclosure which also contains beam splitters, lighting means, and supports for the mounting of props, photographs, and models, creating in essence a compact special effects studio in a box.

40 Claims, 4 Drawing Sheets

COMPOSITE PROCESS VIDEO AND MOTION PICTURE PHOTOGRAPHY SYSTEM AND METHOD

BACKGROUND OF THE INVENTION

The present invention relates to the field of photography, and more specifically to a matteless composite process video and motion picture photography system and method using reduced virtual imaging.

Prior Art

Process photography involves the blending together of two or more separate objects or images, such as an actor and a projected background scene, to form a single, composite, photographic picture. Two commonly used process photography techniques are front and dual projection.

In front projection, the actor performs on a stage, and the background scene is projected on a screen behind the stage. An angled beam splitter is used to allow the camera to view the projected image along the same optical axis along which the image is projected.

In dual projection, two screens are used: one generally placed directly in front of the camera and the second placed at a right angle to the first screen. Stages for actors may be located in front of one or both screens. A beam splitter is used to project identical images to both screens, as well as to allow the camera to view both screens simultaneously. Mattes and countermattes can be placed in front of each screen and stage to mask off certain portions of the screen and stage visible to the camera. Actors can thereby be made to appear to move between objects projected on the screens, giving the illusion of depth.

Problems associated with dual projection include the need for two separate, full-size screens and stages, and very large mattes and countermattes, in order to produce satisfactory results. Such large mattes are expensive and time consuming to make, and bulky and difficult to manipulate. Props, if they are used, must also be large and lifesize.

Several prior art techniques have attempted to overcome the above limitations of conventional dual projection systems. In one prior art technique, a field lens is placed between the camera and the side screen, allowing a much smaller side screen, and smaller countermattes and props to be used. However, a large glass matte is still required for the front screen. In another prior art technique, only the portion of the projected image in which the actors actually appear is projected onto a small front screen while the whole image is projected on to side screen, whose size is also reduced via a field lens as described above. However, this technique can only be used when actors are to fill only a portion of the projected screen.

Finally, U.S. Pat. No. 4,527,872 discloses a system in which the camera focusses not on the front screen but on a reduced focussed aerial image of the front screen formed in a plane between two condensing lenses placed in the optical path between the camera and the front screen. The resulting smaller aerial image and shorter focussing distance allows the use of smaller mattes, props, and models (placed adjacent to the focussed aerial image) than required in conventional dual or front projection systems. An aerial image of the side screen can also be formed. Drawbacks of this system, however, include the need for a complicated lens system for forming the reduced focussed aerial images as well as the sensitivity of the reduced focussed aerial images to any stray light. In addition, the range of focus is limited to the distance between the two reduced focussed aerial image forming condensing lenses.

SUMMARY OF THE INVENTION

The present invention overcomes the limitations of the prior art not by producing a reduced focussed image of a scene by using positive, condensing lenses, but by creating and photographing reduced virtual images produced by negative lenses or mirrors. The virtual images formed are accurate, three dimensional, miniaturized representations of the objects seen by the negative lens or mirror. The camera is focussed on these virtual images, which may be situated as close to the camera as the focussing range of the camera lens permits. Through the use of beam splitters or mirrors, small mattes, props, models and images such as photographs and diapositives can easily be superimposed with the virtual images by positioning them at approximately th same distance from the camera as the virtual image, or, in some cases, at the surface of the lens or mirror. Mattes are not necessary. The props can be made to appear to be situated in front of or behind the virtual image simply by changing their relative illumination. It has also been found that photographing virtual images results in a more realistic depth perception than photographing the original scene or a focussed real image. As a result, zooming in on the virtual image can be accomplished without the foreshortening that normally occurs.

In one embodiment of the invention, the virtual image is formed inside a compact (approximately 5 cubic foot) enclosure. The enclosure also contains beam splitters, lighting means and supports for the mounting of props, photographs and models, creating in essence, a compact special effects studio in a box. The present invention allows composite pictures and special effects to be created more economically, more realistically, more quickly and more easily than prior art composite process cinematography techniques.

DETAILED DESCRIPTION OF THE INVENTION

An improved composite process video, motion picture, and still photography system and method are disclosed. In the following description, for purposes of explanation, numerous details are set forth, such as specific materials, arrangements, and proportions in order to provide a thorough understanding of the present invention. However, it will be apparent to one skilled in the art that the invention may be practiced without these specific details. In other instances, well known components, such as lenses, screens, projectors, mattes, beam splitters and cameras have not been described in detail so as not to obscure the present invention unnecessarily.

Figure 1:
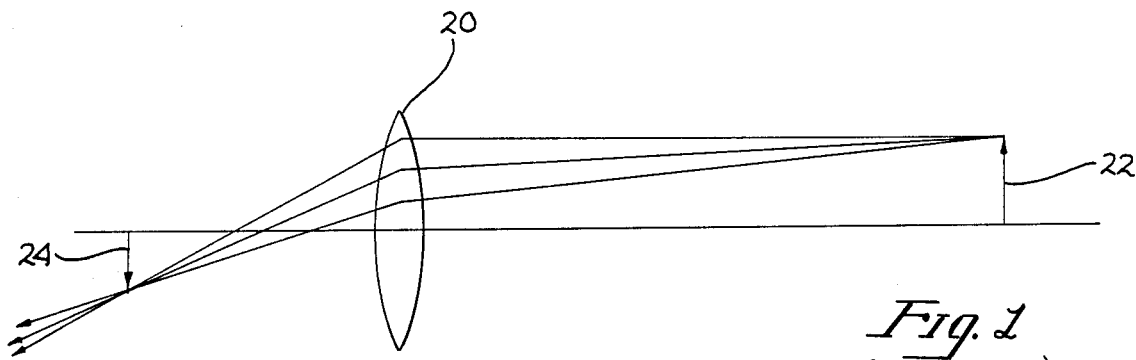
FIG. 1 is a schematic diagram illustrating the formation of a real, focussed image by a positive lens of the prior art.

Referring first to FIG. 1, this figure illustrates the formation of a focussed, real image by a positive lens as used in prior art reduced image composite cinematography systems. A positive lens 20 gathers light rays originating from an object 22, located at a distance in front of positive lens 20, and concentrates those rays behind positive lens 20 forming a focussed, inverted real image 24. Image 24 is real in the sense that it is actually located where it appears to be, such that if a film or a screen is placed at the location of the image, that image will appear on the film or screen. However, without such a screen or other collimating means, the real image is invisible and cannot be photographed.

Figure 2:
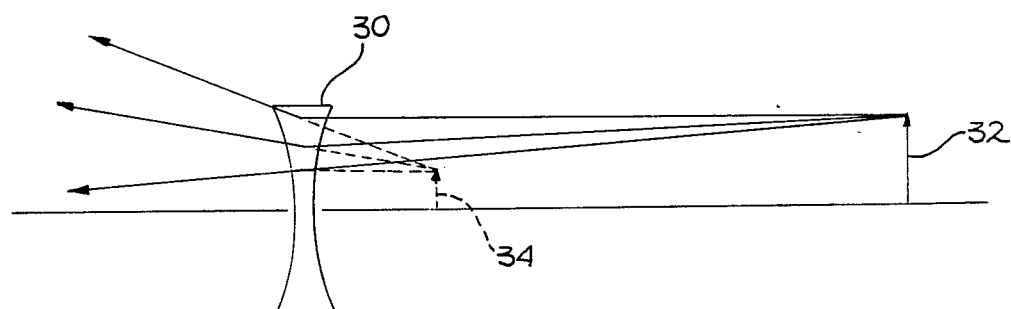
FIG. 2 is a schematic diagram illustrating the formation of a virtual image by a negative lens.

FIG. 2 illustrates the formation of a virtual image by a negative lens, as used in the present invention. Negative lens 30 may be a double concave lens as shown, or may be a plano concave, concave meniscus, or any other diverging lens. Instead of concentrating light rays to form a real focussed image behind the lens as does a positive lens, negative lens 30 causes incoming light rays from object 32 to diverge, creating the illusion that the rays are being emitted from an object located immediately in front of the negative lens, as indicated by item 34. Item 34 is a virtual image because the light rays only appear to originate from that location. No actual image, either at the location of the virtual image, or anywhere else, is formed.

From the back of the lens (i.e., the side facing away from the virtual image), however, the virtual image looks and acts like a miniature three dimensional model of the original object. It should also be noted that, unlike a real image formed with the prior art, the virtual image is upright, not inverted.

Figure 3:
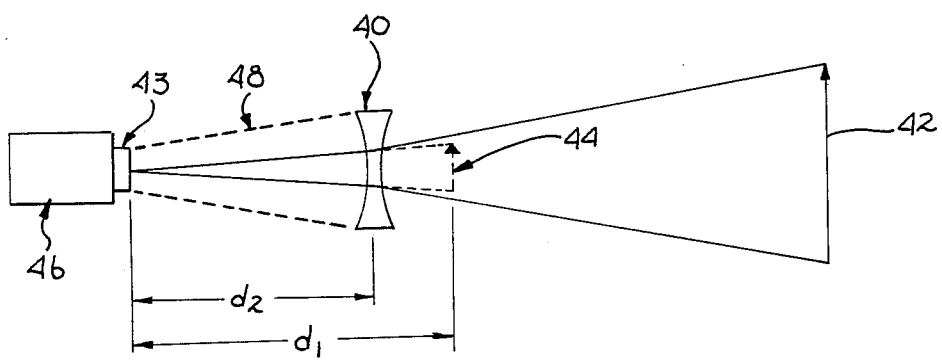
FIG. 3 is a schematic diagram illustrating the simplest embodiment of the present invention.

FIG. 3 illustrates the basic principle of virtual image photography as used in the present invention. A negative lens 40 is used to form a virtual image 44 of object 42. Camera 46, instead of being focussed at infinity to take a picture of distant object 42, is focussed at a distance $d_1$, the distance from camera lens 43 to virtual image 44. Distance $d_1$, depends primarily on the focal length of negative lens 40 and on the distance $d_2$ between negative lens 40 and camera lens 43. Camera lens 43 may be any conventional lens such as a closeup, normal, wide angle, telephoto, or a zoom lens capable of focussing at distance $d_1$. By choosing a combination of camera lens 43 and negative lens 40 for which $d_2$ is not excessive, a housing, indicated by dotted lines 48 in FIG. 3, can be used to permanently attach negative lens 40 to camera lens 43, forming a compact virtual image photography lens system. In the preferred embodiment of such a lens system, camera lens 43 comprises a 4 diopter positive lens and negative lens 40 comprises a 5 diopter negative lens. The lens system may include focussing means for varying the distance between camera lens 43 and negative lens 40, or between camera lens 43 and the photographic film or other image recording media of the camera (such as a charge coupled device if the camera is a video camera) for focussing the real image formed by the camera lens 43 on the recording media.

It has been found that an interesting phenomena occurs when an ordinary camera is used to photograph the virtual image of an object or a group of objects, as opposed to photographing the object or objects directly: depth perception is improved, the depth of field is increased, and depth distortions are minimized. It has also been found that when using a zoom lens to photograph the virtual images of objects located at different distances from the camera, zooming the lens will make it appear that the objects are moving towards the camera, without the distortions in perspective that normally occur when a zoom lens is used. It is believed that these phenomena are the result of the negative lens compressing the virtual images of distant objects into a relatively small range of distances close to the camera, such that, in addition to size, the inter-object spacing of the virtual images of the objects, as compared to the spacing between the objects themselves, is greatly reduced. It has also been found that video pictures taken with a video camera incorporating a virtual image photography lens system tend to approach the historically higher quality of motion pictures taken on film.

Figure 4:
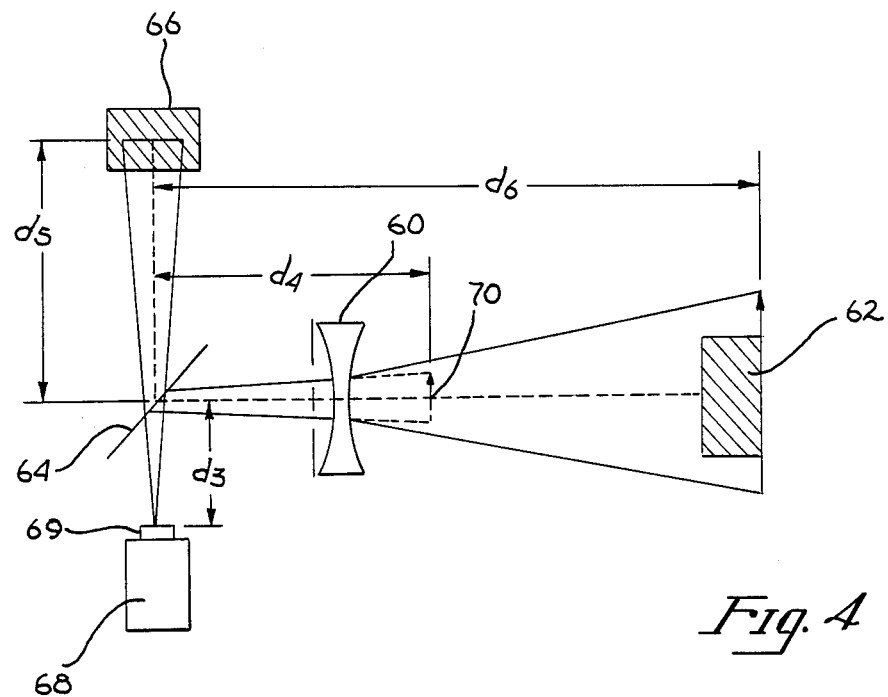
FIG. 4 is a schematic diagram illustrating a second embodiment of the present invention.

FIG. 4 illustrates a simple embodiment of the present invention that can be used to produce matteless, composite video, motion picture, or still photographic images incorporating live actors, models, and paintings, drawings or photographs. In this embodiment, negative lens 60 is used to form a reduced virtual image 70 of stage 62, which may contain actors as well as full size models or props. Virtual image 70 is reflected by beam splitter 64 to camera 68. Camera 68 is focussed at distance equal to the sum of the distance from the camera lens 69 to the center of beam splitter 64 plus the distance from the center of beam splitter 64 to virtual image 70, designated distances $d_3$ and $d_4$, respectively, in FIG. 4. Camera 68 will at the same time be focussed on secondary stage 66, which is located a distance $d_5$, equal to $d_4$, behind beam splitter 64 in line with camera 68. Actors on stage 62 and objects on secondary stage 66 will therefore be in focus at the same time. It should be noted that although it is not evident from FIG. 4 (in which dimensions have not been drawn to scale for purposes of clarity) the distance $d_6$ between the beam splitter 64 and stage 62 is on the order of ten to twenty times distance $d_5$ from the beam splitter 64 to secondary stage 66. In order for a prop placed on secondary stage 66 to appear to be the same size as an actor performing on stage 62, the prop need be only one tenth to one twentieth the size of the actor. For instance, a six inch tall can of soda placed on secondary stage 66 will appear to camera 68 to be the same height as a six foot actor performing on stage 62.

A prop placed on secondary stage 66 can be made to appear in front of or behind an actor on stage 62 simply by adjusting the relative illumination on the actor and the prop: the more highly illuminated object will appear to be in front of the less highly illuminated object.

In addition to props and models, pictures can also be placed on secondary stage 66. For example, an 8"×10" photograph placed on stage 66 can form a full screen background for the actor on stage 62. Larger or smaller photographs, pictures, and drawings, or parts thereof, can also be used. An actor can be made to appear to walk behind a picture of a silhouette of a house placed on secondary stage 66, simply by changing the relative illumination on the picture and the actor. Alternatively, an actor can be made to appear in a cutout of a window or doorway of the house pictured.

Mirrors or other reflective surfaces such as beam splitters can also be used, instead of negative lenses, to form virtual images. Spherical, parabolic, or other curved mirrors or beam splitters can be used. A concave mirror or beam splitter can be used to form virtual images of near objects, i.e., objects located less than one focal length from the mirror or beam splitter, while a convex mirror or beam splitter can be used to form virtual images of both near and far objects. Both negative mirrors and lenses can form virtual images from real objects as well as real objects. Such real images, in turn, can be formed by either concave mirrors or positive lenses.

Figure 5:
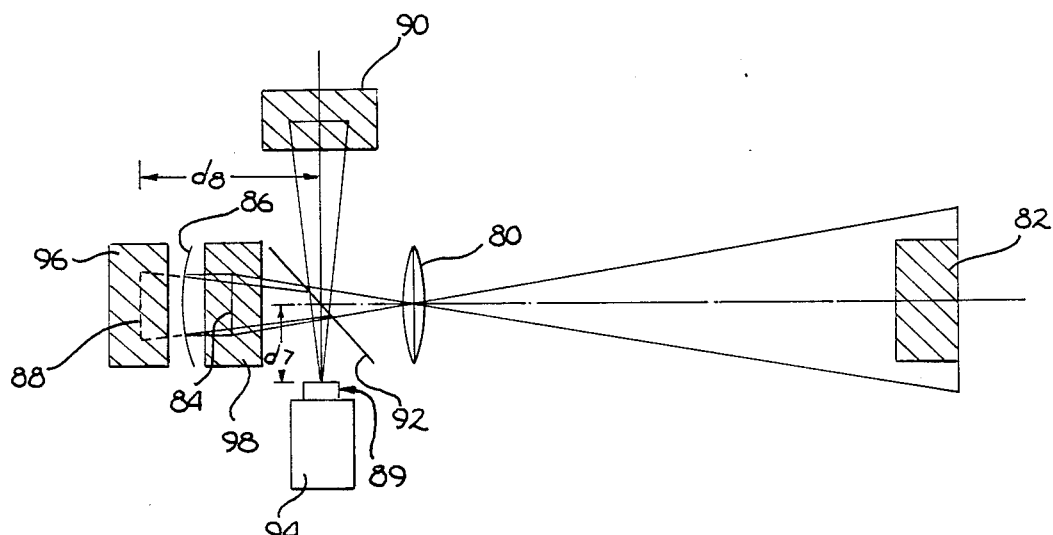
FIG. 5 is a schematic diagram illustrating a third embodiment of the present invention.

FIG. 5 illustrates an embodiment of the present invention in which a concave spherical or parabolic beam splitter is used to produce the virtual image. First, a positive lens 80 is used to form an inverted real image 84 in front of concave beam splitter 86. It should be noted that because real image 84 is inverted virtual image 88 is inverted also. Concave beam splitter 86 in turn forms a virtual image 88 of the real image 84 behind concave beam splitter 86. Camera 84 is focussed on virtual image 88 via 45 degree angled beam splitter 92. The lens 89 of camera 94 is thus focussed at a distance equal to the sum of $d_7$ and $d_8$, the distance from the lens 89 to angled beam splitter 92 and from angled beam splitter 92 to virtual image 88, respectively. The result of the arrangement of the lens and beam splitters in this embodiment of the invention is that four areas, or stages, are in focus and are seen by the camera simultaneously: full size stage 82, and three secondary stages 90, 96 and 98.

First secondary stage 90 is equivalent to the secondary stage 66 of FIG. 4. It is located in line with camera lens 89 at a distance equal to the distance from the camera lens 89 to the virtual image 88. Second secondary stage 96 comprises the area in the immediate vicinity of virtual image 88. Objects placed on secondary stage 96 will be in focus and visible to camera 94 by virtue of concave beam splitter 86, which allows a portion of the light rays originating from objects placed on secondary stage 96 to pass through in an unaltered state, as if concave beam splitter 86 were not there. Third secondary stage 98 comprises the area immediately around real image 84. Objects placed on secondary stage 98 will be included in virtual image 88 formed by concave beam splitter 86. By controlling the relative illumination of objects placed on the secondary stages and actors performing on stage 82, the objects and actors can be made to appear in front of, behind of, or in the same place as each other in any desired order.

Photographs, pictures, or silhouettes of objects can also be mounted directly onto the surface of concave beam splitter 86. The actors on stage 82 will appear to be behind whatever objects are pictured, as the picture blocks off part of the virtual image from the lens of the camera.

Figure 6:
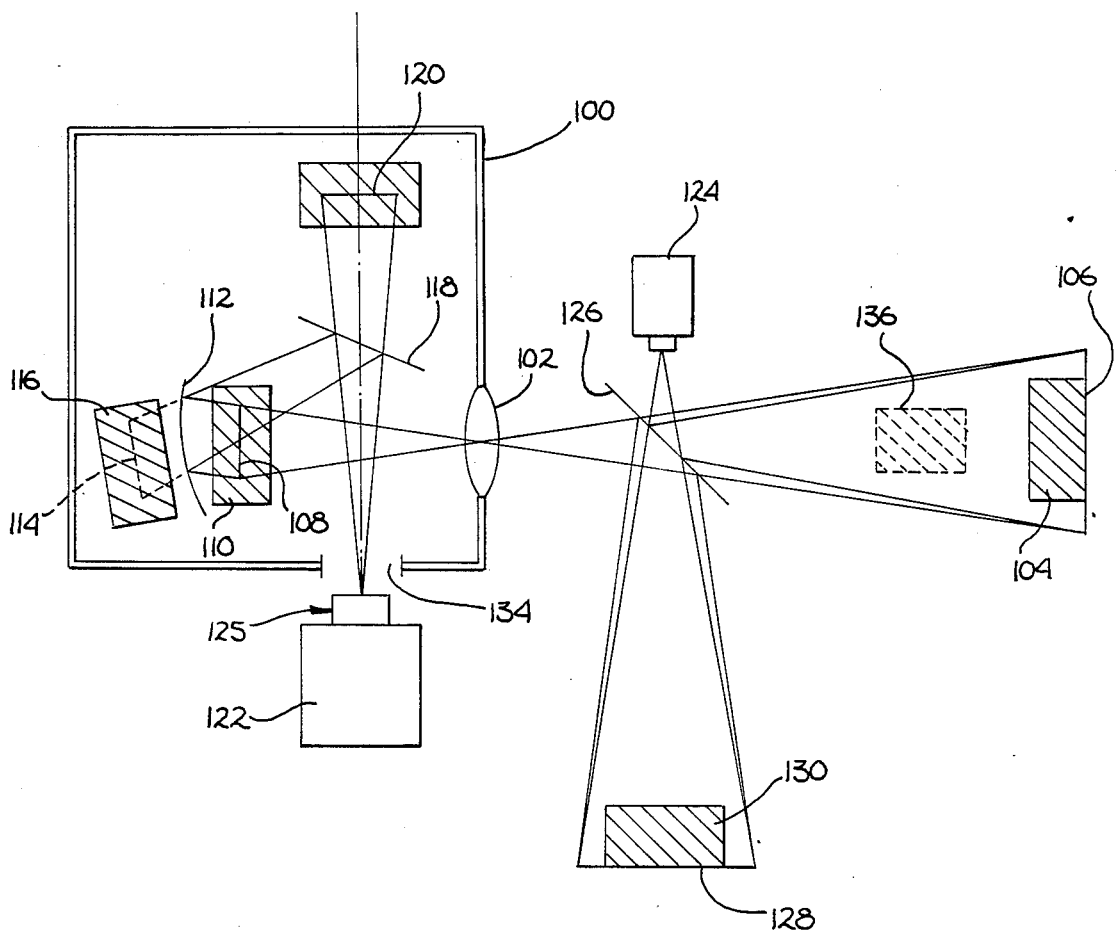
FIG. 6 is a schematic diagram illustrating the preferred embodiment of the present invention.
Figure 7:
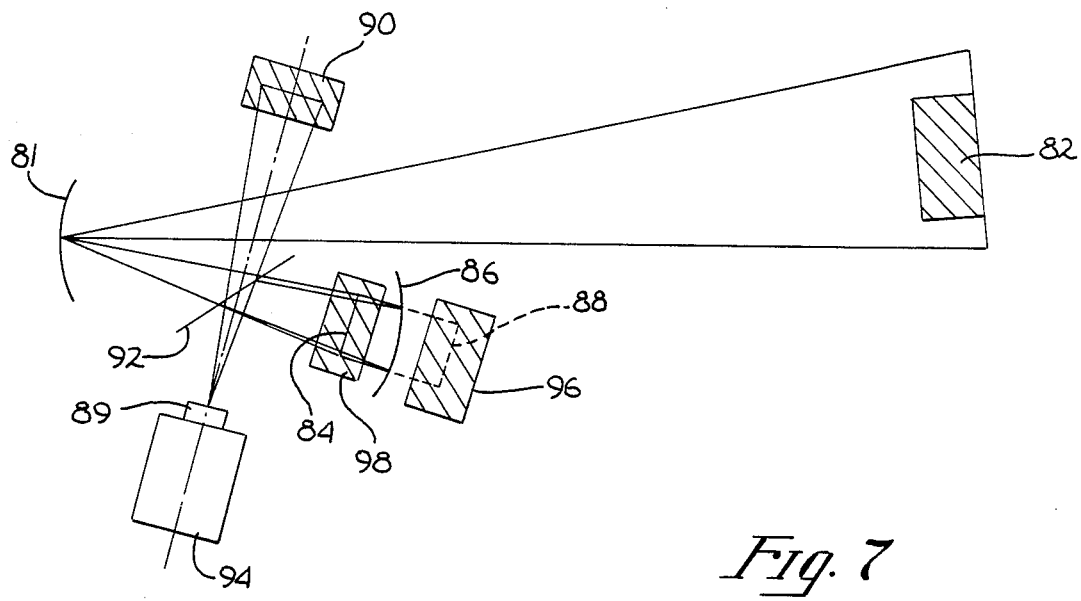
FIG. 7 is a schematic diagram illustrating an alternative embodiment of the embodiment of FIG. 5.

FIG. 7 shows an alternative embodiment of the embodiment of FIG. 6 in which a second concave mirror 81 is used instead of positive lens 80. The virtual image in this embodiment is formed with mirrors or beam splitters only: no lenses are needed. Like positive lens 80, concave mirror 81 forms an inverted real image 84 of stage 82 in front of concave beam splitter 86. As in the previous embodiment, concave beam splitter 86 then forms a virtual image 88 of real image 86, and camera 94 simultaneously sees stages 82, 90, 96, and 98. (Because real image 84 is formed by reflection by mirror 81 rather than refraction by lens 80, it will be noted that the location of the various stages is somewhat different than in the previous embodiment.)

Figure 8:
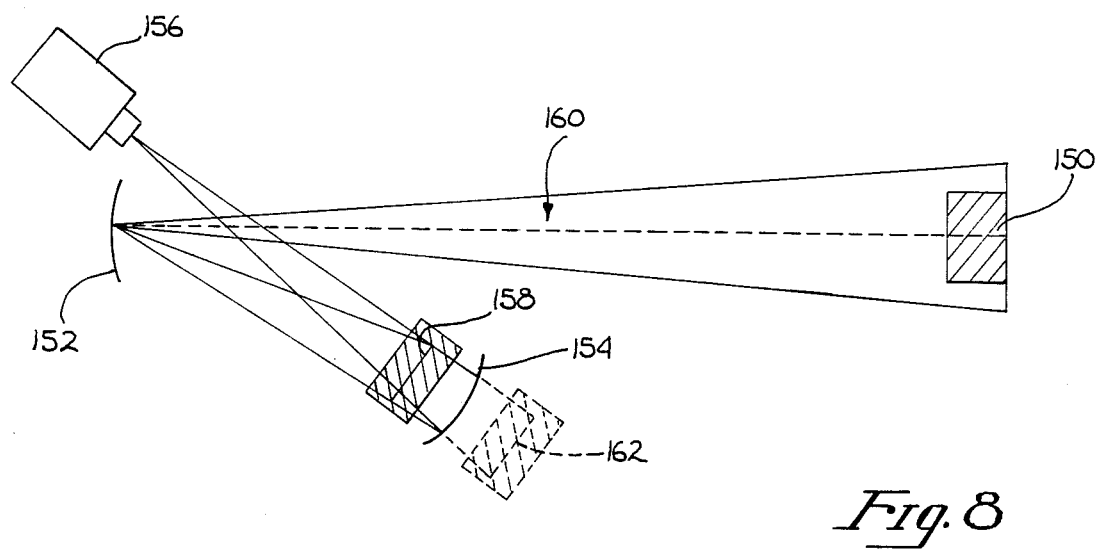
FIG. 8 is a schematic diagram illustrating a simple embodiment of the present invention in which two concave mirrors are used to form the virtual image.

FIG. 8 illustrates a simpler embodiment of the present invention in which two concave mirrors, and no lenses, are used to form the virtual image. A first concave mirror 152 is oriented such that it focuses a real image 158 of stage 150 to one side of optical axis 160 running from the center of concave mirror 152 to stage 150. Second concave mirror 154, in turn, is then used to form a virtual image 162 of real image 158 behind second concave mirror 154. Camera 156 is located to one side and behind first concave mirror 152 such that it has a clear line of sight to virtual image 162.

The preferred embodiment of the present invention is illustrated in FIG. 6. In this embodiment, the major components of the invention, including system lens 102, concave mirror or beam splitter 112, and straight beam splitter 118, are contained in an enclosure 100. Enclosure 100 is of a relatively small size, measuring approximately 3 feet long by two feet high and two feet wide, such that it is portable and can be used to create special composite effects both indoors and out.

The virtual image forming system in this embodiment is similar to the system illustrated in FIG. 5 with the exception that concave mirror or beam splitter 112 is placed at an angle of approximately 10 degrees with respect to the optical axis of system lens 102, while straight beam splitter 118 is angled at 35 degrees instead of 45 degrees with respect to the optical axis of camera 122. These orientations of the mirrors or beam splitters allow straight beam splitter 118 to be located to one side of the optical axis of system lens 102, increasing the amount of light from system lens 102 hitting concave beam splitter 112, as compared to the embodiment of FIG. 5, where half of the light is reflected away from concave beam splitter 86 by beam splitter 92. If secondary stage 120 is not being used, straight beam splitter 118 can be replaced with a straight first surface mirror, thereby further increasing the amount of light from virtual image 114 received by camera 122. Camera 122 is focussed on virtual image 114 through opening 134 in enclosure 100. As in the previous embodiment, actors on primary stage 104 and objects on secondary stages 110, 114 and 120 can be superimposed.

System lens 102 may be any appropriately sized single or compound positive lens, for example, a five inch diameter, twenty inch focal length, two diopter lens. Concave mirror or beam splitter 112 is typically rectangular with dimensions of approximately eight by ten inches or larger, and preferably has a focal length of about 39.37 inches (one diopter). Straight beam splitter 118 is preferably located about 14 inches from concave mirror or beam splitter 112, resulting in a camera to virtual image distance of about 48 inches, depending on the position of the camera and the type of camera lens 125 used. Camera lens 125 may be any type of conventional camera lens, including close-up, wide-angle, telephoto, zoom, fish-eye, or other special effects lens, each of which can be used to create a different photographic effect.

Enclosure 100 may also contain fixtures for mounting or displaying various kinds of props, models or pictures on the three secondary stages, and lights for variable illumination of the different stages. Small screens may also be placed on the secondary stages, allowing fixed or moving projected images to be combined with objects and actors on the other stages.

The present invention can also be used as part of a conventional front projection and/or dual projection system. Referring to FIG. 6, the system can be adapted for front projection photography by mounting a 45 degree beam splitter 126 between the system lens 102 and stage 104, placing a screen 106 behind stage 104, and positioning a camera at a right angle to the optical path from stage 104 to system lens 102 such that the image projected by the projector is projected behind the actors onto screen 106. A second screen 127 can be placed directly in front of projector 124. Actors performing on stage 104 can be blended into the projected scene through the use of mattes and countermattes as in conventional front or dual projection systems, and models, props, or fixed or moving pictures placed on stages 120, 116, and 110 can also be superimposed. Alternatively, straight beam splitter 126 can be oriented such that it reflects an actor or items suspended from above. An actor suspended from his feet will through the use of such a beam splitter give the impression of flying out of the screen. Since a zoom lens can be zoomed in on the virtual image formed by concave mirror or beam splitter 112 without the foreshortening of the prior art, the actor can be made to realistically appear to fly out of the screen simply by zooming in with the zoom lens.

The preferred embodiment therefore allows the selective superimposition of actors, images, models, props and photographs from six different stages.

Accordingly, a novel composite process video and motion picture photography system and apparatus have been disclosed. The invention allows the creation of special effects of a greater variety, higher quality and lower cost than is attainable by the prior art. Although specific details are described herein, it will be understood that various changes can be made in the materials, details, arrangements and proportions of the various elements of the present invention without departing from the scope of the invention. For instance, by using various filters in front of the system lens or either of the stages, various special lighting and matting effects, including ultraviolet and infra red, can be created. By using a blue background on the secondary stage that is in line with the camera, blue screen photography is possible without the need of a large screen for the actors to perform in front of, as required in the prior art. Sprays of water or smoke can be introduced into the enclosure of the preferred embodiment to simulate rain or fog. The invention can be used as an optical printer or for titling. The large system lens, used with an oscillating shutter, can potentially produce stereo three dimensional motion pictures that do not require the use of polarizing glasses or other viewing aids. The virtual image concept of the present invention can also be incorporated into other optical systems, such as lenses for conventional 35 mm cameras, or for telescopes, microscopes or other optical instruments. Various combinations of positive and negative beam splitters, mirrors, and lenses can be used. Other variations will be obvious to those skilled in the art.

I claim:

1. A composite process photography system comprising:
    a virtual image forming means for forming a virtual image of a first object comprising a focussing lens means and a curved reflecting means, said focussing lens means forming a real image of said first object adjacent to a first side of said curved reflecting means, said curved reflecting means forming a virtual image of said real image of said first object adjacent to a second side of said curved reflecting means, wherein said curved reflecting means comprises a concave semi-transparent and semi-reflective glass plate;
    a camera means;
    a second object, an image of which is desired to be superimposed with said virtual image of said first object; and
    directing means for directing light rays from said virtual image and said second object to said camera means, said directing means disposed such that a first optical path from said camera means to said virtual image is approximately equal in length to a second optical path from said camera means to said second object;
    whereby a composite image of said virtual image and said second object is formed for photographing by said camera means.

2. The composite process photography system of claim 1 further comprising first object supporting means for supporting objects images of which it is desired to superimpose with said virtual image, said first object supporting means being disposed adjacent to said real image of said first object formed by said focussing lens means.

3. The composite process photography system of claim 2 further comprising second object supporting means for supporting objects images of which it is desired to superimpose with said virtual image, said second object supporting means being disposed adjacent to said virtual image formed by said concave glass plate.

4. The composite process photography system of claim 3 wherein said glass plate has a surface normal axis perpendicular to a center of its first side.

5. The composite process photography system of claim 4 wherein said surface normal axis of said glass plate faces said first object.

6. The composite process photography system of claim 4 wherein said surface normal axis of said glass plate makes an angle of between 0 degrees and 90 degrees with an optical axis running form said first object to said center of said glass plate.

7. The composite process photography system of claim 6 wherein said angle comprises approximately 10 degrees.

8. The composite process photography system of claim 7 wherein said directing means is disposed along said first optical axis but not along said second optical axis.

9. The composite process photography system of claim 8 wherein said virtual image forming means, said directing means, said second object, said first object supporting means, and said second object supporting means are mounted in an enclosure means, said enclosure means having a first opening means facing said first object and a second opening means facing said camera.

10. The composite process photography system of claim 1 wherein said camera means comprises a motion picture camera.

11. The composite process photography system of claim 1 wherein said camera means comprises a video camera.

12. A composite process photography system comprising:

a virtual image forming means for forming a virtual image of a first object;

a camera means;

a second object, an image of which is desired to be superimposed with said virtual image of said first object;

first directing means comprising a semi-transparent, semi-reflective glass plate for directing light rays from said virtual image and said second object to said camera means, said directing means disposed such that a first optical path from said camera means to said virtual image is approximately equal in length to a second optical path from said camera means to said second object; and a projector means disposed adjacent to said second optical axis and a second semi-transparent, semi-reflective directing means disposed along said second optical axis, such that an image is projected by said projector means along said second optical axis to said reflecting screen means;

wherein said camera means faces said second object, said directing means is disposed along a first optical axis from said camera means to said second object, and said virtual image is disposed along a second optical axis running from said first object through a center of said directing means, said second optical axis being perpendicular to said first optical axis; and wherein said first object comprises a stage on which actors can perform and reflective screen means onto which an image can be projected;

whereby a composite image of said virtual image and said second object is formed for photographing by said camera means.

13. The composite process photography system of claim 12 further comprising a second reflective screen means facing said projector means such that said virtual image forming means forms a virtual image of said second reflective screen means superimposed with a virtual image of said first object.

14. The composite process photography system of claim 9 further comprising a second semi-transparent, semi-reflective directing means disposed along said second optical axis said second directing means being oriented such that light rays from a third object disposed along a line perpendicular to said second optical axis are directed along said second optical axis to said virtual image forming means.

15. A photographic system comprising:
camera means for photographing an image;
virtual image forming means for forming a reduced virtual image of a first object to be photographed; and
stage means located at an apparent location of said virtual image for supporting a second object to be photographed;
whereby a composite image of said first and second objects is photographed.

16. The photographic system of claim 15 in which said virtual image forming means is located at a fixed, predetermined distance from said camera means.

17. The photographic system of claim 15 wherein said virtual image forming means comprises a diverging lens means.

18. The photographic system of claim 15 wherein said virtual image forming means comprises a curved reflecting means.

19. The photographic system of claim 15 in which said camera means comprises a still camera.

20. The photographic system of claim 15 wherein said camera means comprises a motion picture camera.

21. The photographic system of claim 15 wherein said camera means comprises a video camera.

22. The photographic system of claim 15 wherein said first object is a live actor.

23. The photographic system of claim 15 wherein said second object is a reduced scale prop.

24. The photographic system of claim 18 further comprising a focussing lens means for forming a real image of said first object adjacent to a first side of said curved reflecting means, said curved reflecting means forming a virtual image of said real image of said first object adjacent to a second side of said curved reflecting means.

25. The composite process photography system of claim 24 wherein said curved reflecting means comprises a concave mirror means.

26. The photographic system of claim 15 further comprising beam splitter means for superimposing said reduced virtual image of said first object on said stage means.

27. The photographic system of claim 26 wherein said beam splitter means is a semi-reflective mirror.

28. The photographic system of claim 24 wherein said second object is attached to said first side of said curved reflecting means.

29. The photographic system of claim 28 wherein said second object is a two dimensional prop.

30. A method for making composite photographic images comprising the steps of:
(a) forming a reducing virtual image of a first object;
(b) placing a camera at a predetermined distance from said reduced virtual image;
(c) placing a second object at said predetermined distance from said camera; and
(d) optically combining said reduced virtual image with an image of said second object so as to form a composite image within said camera.

31. The method of claim 30 wherein said reduced virtual image is formed with a diverging lens means.

32. The method of claim 30 wherein said reduced virtual image is formed with a curved reflecting means.

33. The method of claim 30 wherein said second object is co-located with said reduced virtual image.

34. A photographic system comprising:
a housing having first and second apertures, said first aperture disposed so as to admit light reflected from an object to be photographed;
virtual image forming means disposed within said housing for forming a reduced virtual image of said object; and
camera means disposed at said second aperture for photographing said reduced virtual image;
whereby said camera is focussed on said reduced virtual image at a distance substantially less than the distance between said camera and said object to be photographed.

35. The photographic system of claim 34 wherein said virtual image forming means comprises a diverging lens.

36. The photographic system of claim 34 wherein said virtual image forming means comprises a focussing lens and curved reflecting means.

37. The photographic system of claim 36 wherein said curved reflecting means comprises a concave mirror.

38. The photographic system of claim 34 wherein said camera means comprises a still camera.

39. The photographic system of claim 34 wherein said camera means comprises a motion picture camera.

40. The photographic system of claim 34 wherein said camera means comprises a video camera.

* * * * *